(12) United States Patent
Rao

(10) Patent No.: US 12,170,074 B2
(45) Date of Patent: Dec. 17, 2024

(54) COLOR CORRECTION METHOD, FIELD PROGRAMMABLE GATE ARRAY, CHIP AND DISPLAY DEVICE

(71) Applicant: BOE TECHNOLOGY GROUP CO., LTD., Beijing (CN)

(72) Inventor: Tianmin Rao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/640,848

(22) PCT Filed: Mar. 31, 2021

(86) PCT No.: PCT/CN2021/084533
§ 371 (c)(1),
(2) Date: Mar. 7, 2022

(87) PCT Pub. No.: WO2022/205127
PCT Pub. Date: Oct. 6, 2022

(65) Prior Publication Data
US 2024/0046901 A1    Feb. 8, 2024

(51) Int. Cl.
*G09G 5/04*    (2006.01)
*G09G 5/02*    (2006.01)

(52) U.S. Cl.
CPC .............. *G09G 5/024* (2013.01); *G09G 5/04* (2013.01); *G09G 2320/0242* (2013.01); *G09G 2320/0693* (2013.01); *G09G 2340/06* (2013.01)

(58) Field of Classification Search
CPC ........ G09G 2340/06; G09G 5/02; G09G 5/24; G09G 5/04; G09G 2320/0242; G09G 2360/16; G09G 2320/0693
See application file for complete search history.

(56) References Cited

U.S. PATENT DOCUMENTS

2008/0239403 A1* 10/2008 Hagiwara ............ H04N 1/6019
   358/3.23
2021/0152801 A1* 5/2021 Wang ..................... H04N 11/20

FOREIGN PATENT DOCUMENTS

CN    101123080 A    2/2008
CN    102769759 A    11/2012
(Continued)

OTHER PUBLICATIONS

Sun Lue, "Advanced Motion Picture Technology," vol. 3, 2007, Institute of Digital Media Technology, Beijing Film Academy.
(Continued)

*Primary Examiner* — Hau H Nguyen
(74) *Attorney, Agent, or Firm* — HOUTTEMAN LAW LLC

(57) ABSTRACT

The present disclosure provides a color correction method, including: in response to original color data of a pixel, converting the original color data into original color coordinates in an original color space; mapping the original color coordinates to a sampling point space to obtain a mapped point corresponding to the original color coordinates in the sampling point space, and determining, according to mapped coordinates of the mapped point, a plurality of reference point coordinates corresponding to the mapped coordinates; obtaining reference point addresses of the reference point coordinates, and simultaneously reading color data of the reference point coordinates according to the reference point addresses; and obtaining corrected color data of the pixel through an interpolation algorithm according to the color data of the reference point coordinates. The present disclosure further provides a Field Programmable Gate Array, a chip and a display device.

20 Claims, 7 Drawing Sheets

(56) References Cited

FOREIGN PATENT DOCUMENTS

| CN | 103209331 A | 7/2013 |
|---|---|---|
| CN | 109961401 A | 7/2019 |
| CN | 111770320 A | 10/2020 |
| CN | 112017105 A | 12/2020 |

OTHER PUBLICATIONS

Meza et al., "Embedded real-time look-up table processing for high definition video signals," 2010, IEEE International Conference on Automation, Quality and Testing, Robotics.

\* cited by examiner

S4

> correcting all color components corresponding to the color data of the reference point coordinates through the interpolation algorithm; when any one of the color components is corrected, a trilinear interpolation operation is performed based on the first direction, the second direction and the third direction according to corresponding color component data in the color data of the reference point coordinates — S401

> according to color component data corresponding to four adjacent groups of reference points in the first direction, simultaneously performing four interpolation operations in the first direction, and storing results of the four interpolation operations in corresponding first registers respectively — S4011

> reading data from each of the first registers, simultaneously performing two interpolation operations in the second direction, and storing results of the two interpolation operations in corresponding second registers respectively — S4012

> reading data from each of the second registers, and performing an interpolation operation in the third direction to obtain corrected color component data — S4013

FIG. 8

COLOR CORRECTION METHOD, FIELD PROGRAMMABLE GATE ARRAY, CHIP AND DISPLAY DEVICE

TECHNICAL FIELD

The present disclosure relates to the field of image and video technologies, and in particular, to a color correction method, a Field Programmable Gate Array, a chip and a display device.

BACKGROUND

With the development of image and video technologies, a more perfect display effect of video images is pursued increasingly by people. Among many image characteristics, color is one of the most direct perceptual attributes of a human visual system and has been deeply and widely studied. Color management is a must-have function of high-end displays, and screens which are different in display characteristic can achieve the same color expression as a standard image after color correction. Applications of the Ultra-High Definition image technology are gradually increasing. When used to process images of the Ultra-High Definition image technology, especially high-definition and high-quality images/videos, existing color correction methods cannot realize high-precision and low-latency quick color correction, need long rendering time, and cannot meet an immediacy requirement of data stream processing.

SUMMARY

The present disclosure aims to solve at least one of the technical problems in the prior art, and provides a color correction method, a Field Programmable Gate Array, a chip and a display device.

To achieve the above objective, in a first aspect, embodiments of the present disclosure provide a color correction method, including:

in response to original color data of a pixel, converting the original color data into original color coordinates in an original color space;

mapping the original color coordinates to a sampling point space to obtain a mapped point corresponding to the original color coordinates in the sampling point space, and determining, according to mapped coordinates of the mapped point, a plurality of reference point coordinates corresponding to the mapped coordinates;

obtaining reference point addresses of the plurality of reference point coordinates, and simultaneously reading color data of all the reference point coordinates according to the plurality of reference point addresses; and obtaining corrected color data of the pixel through an interpolation algorithm according to the color data of the plurality of reference point coordinates.

In some implementations, the mapping the original color coordinates to the sampling point space includes:

performing coordinate mapping on the original color coordinates at least according to quantization bits of the original color space and a number of sampling points of the sampling point space, so as to obtain the mapped point.

In some implementations, the performing coordinate mapping on the original color coordinates at least according to the quantization bits of the original color space and the number of sampling points of the sampling point space so as to obtain the mapped point includes:

determining a quantitative ratio according to the quantization bits and the number of sampling points, performing the coordinate mapping on the original color coordinates according to the quantitative ratio, and performing quantization operation on a coordinate mapping result based on a preset quantitative level to obtain a quantization operation result; and performing a right shift operation on the quantization operation result based on the quantitative level, and taking a right shift operation result as the mapped coordinates of the mapped point.

In some implementations, the performing coordinate mapping on the original color coordinates at least according to the quantization bits of the original color space and the number of sampling points of the sampling point space so as to obtain the mapped point includes:

determining a quantitative ratio according to the quantization bits and the number of sampling points, rounding a product of the quantitative ratio and a preset quantitative level, and performing a quantization operation on the original color coordinates according to a rounding result to obtain a quantization operation result; and subjecting the quantization operation result to a right shift operation based on the quantitative level and rounding, and taking a rounded right shift operation result as the mapped coordinates of the mapped point.

In some implementations, after the quantization operation is performed on the original color coordinates according to the rounding result to obtain the quantization operation result and before the quantization operation result is subjected to the right shift operation based on the quantitative level and rounding, the method further includes:

performing a remainder operation on a coordinate value of each dimension of the original color coordinates and the number of sampling points, and determining an error compensation value corresponding to each dimension of the original color coordinates; and performing an error compensation on the quantization operation result based on each error compensation value.

In some implementations, the sampling point space is a three-dimensional Cartesian coordinate system including a first direction, a second direction and a third direction corresponding to axes thereof; according to a preset number of sampling points, a plurality of sampling points are respectively arranged along the first direction, the second direction and the third direction in the sampling point space and are arranged at equal intervals, every eight adjacent sampling points are taken as vertexes to form a sampling cube, and all sampling cubes form the sampling point space, where the determining, according to the mapped coordinates of the mapped point, the plurality of reference point coordinates corresponding to the mapped coordinates includes:

determining a sampling cube where the mapped point is located, taking eight vertexes of the sampling cube as reference points, and determining reference point coordinates of each of the reference points.

In some implementations, the obtaining the corrected color data through the interpolation algorithm according to the color data of the plurality of reference point coordinates includes:

correcting all color components corresponding to the color data of the plurality of reference point coordinates through the interpolation algorithm; where, when any one of the color components is corrected, a trilinear interpolation operation is performed based on the first direction, the second direction and the third direction according to corresponding color component data in the color data of the plurality of reference point coordinates.

In some implementations, the performing trilinear interpolation operation based on the first direction, the second direction and the third direction according to the corresponding color component data in the color data of the plurality of reference point coordinates includes:

according to color component data corresponding to four adjacent groups of reference points in the first direction, simultaneously performing four interpolation operations in the first direction, and storing results of the four interpolation operations in corresponding first registers respectively;

reading data from each of the first registers, simultaneously performing two interpolation operations in the second direction, and storing results of the two interpolation operations in corresponding second registers respectively; and reading data from each of the second registers, and performing an interpolation operation in the third direction to obtain corrected color component data.

In some implementations, the obtaining the reference point addresses of the plurality of reference point coordinates, and simultaneously reading the color data of the plurality of reference point coordinates according to the reference point addresses includes:

performing an index calculation according to the plurality of reference point coordinates and a number of sampling points to determine the reference point addresses; and simultaneously reading the color data of the plurality of reference point coordinates from read-only memories corresponding to the reference point addresses.

In a second aspect, the embodiments of the present disclosure provide a Field Programmable Gate Array, including:

a plurality of read-only memories configured to store color data of respective reference point coordinates;

a plurality of registers;

a coordinate conversion circuit configured to convert original color data into original color coordinates in an original color space;

a coordinate mapping circuit configured to map the original color coordinates to a sampling point space; where, a quantitative ratio is determined according to quantization bits of the original color space and a number of sampling points of the sampling point space, coordinate mapping is performed on the original color coordinates according to the quantitative ratio, and a quantization operation is performed on a coordinate mapping result based on a preset quantitative level to obtain a quantization operation result; and a right shift operation is performed on the quantization operation result based on the quantitative level, and a right shift operation result is taken as mapped coordinates of a mapped point;

a reference point determination circuit configured to determine a sampling cube where the obtained mapped point is located, take eight vertexes of the sampling cube as reference points, and determine reference point coordinates of the reference points; where, the sampling point space is a three-dimensional Cartesian coordinate system including a first direction, a second direction and a third direction corresponding to axes thereof; according to the number of sampling points, a plurality of sampling points are respectively arranged along the first direction, the second direction and the third direction in the sampling point space and are arranged at equal intervals, every eight adjacent sampling points are taken as vertexes to form a sampling cube, and all the sampling cubes form the sampling point space;

an address determination circuit configured to perform an index calculation according to the reference point coordinates and the number of sampling points to determine reference point addresses;

a color data reading circuit configured to simultaneously read the color data of the reference point coordinates from the read-only memories corresponding to the reference point addresses; and an interpolation correction circuit configured to correct all color components corresponding to the color data of the reference point coordinates through an interpolation algorithm; where, when any one of the color components is corrected, trilinear interpolation operation is performed based on the first direction, the second direction and the third direction according to corresponding color component data in the color data of the reference point coordinates; and results of interpolation operations performed along the first direction, the second direction and the third direction are respectively stored in the respective registers.

In some implementations, the interpolation correction circuit is configured to simultaneously perform, according to color component data corresponding to four adjacent groups of reference points in the first direction, four interpolation operations in the first direction, and store results of the four interpolation operations in corresponding first registers respectively; read data from each of the first registers, simultaneously perform two interpolation operations in the second direction, and store results of the two interpolation operations in corresponding second registers respectively; and read data from each of the second registers, and perform an interpolation operation in the third direction to obtain corrected color component data.

In a third aspect, an embodiment of the present disclosure provides a chip, including:

one or more processors; and a memory configured to store one or more programs;

when the one or more programs are executed by the one or more processors, the one or more processors perform the color correction method described in any one of the embodiments of the present disclosure.

In a fourth aspect, an embodiment of the present disclosure provides a display device, including:

one or more processors; and a memory configured to store one or more programs;

when the one or more programs are executed by the one or more processors, the one or more processors perform the color correction method described in any one of the embodiments of the present disclosure.

BRIEF DESCRIPTION OF DRAWINGS

FIG. 7 is a flowchart illustrating a specific implementation method of step S4 according to the embodiment of the present disclosure;

FIG. 8 is a flowchart illustrating a specific implementation method of step S401 according to the embodiment of the present disclosure;

DETAIL DESCRIPTION OF EMBODIMENTS

In order to enable those of ordinary skill in the art to better understand the technical solutions of the embodiments of the present disclosure, the color correction method, the Field Programmable Gate Array, the chip and the display device provided by the present disclosure are described in detail below with reference to the drawings.

Exemplary embodiments will be described more fully below with reference to the drawings, but the exemplary embodiments described herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

Terms used herein are only used to describe specific embodiments, and are not intended to limit the present disclosure. As used herein, "a" and "the" for the singular form are intended to include the plural form as well, unless otherwise stated in the context. It should be further understood that the term(s) "comprise" and/or "be made of" used herein indicate(s) the presence of the described features, integers, steps, operations, elements and/or components, but do (does) not exclude the presence or addition of one or more other features, integers, steps, operations, elements, components and/or combinations thereof.

It should be understood that the terms "first", "second" and the like can be used to describe various elements herein, but those elements should not be limited by the terms. The terms are only used to distinguish one element from another element. Therefore, without departing from the teaching of the present disclosure, a first element, a first component or a first circuit discussed below can also be called a second element, a second component or a second circuit.

Unless otherwise defined, all terms (including technical and scientific terms) used herein have the same meaning as commonly understood by those of ordinary skill in the art. It should be also understood that terms, such as those defined in commonly used dictionaries, should be interpreted as having a meaning that is consistent with a meaning in the context of the related art and the present disclosure, and should not be interpreted in an idealized or overly formal sense unless expressly defined herein.

Figure 1:
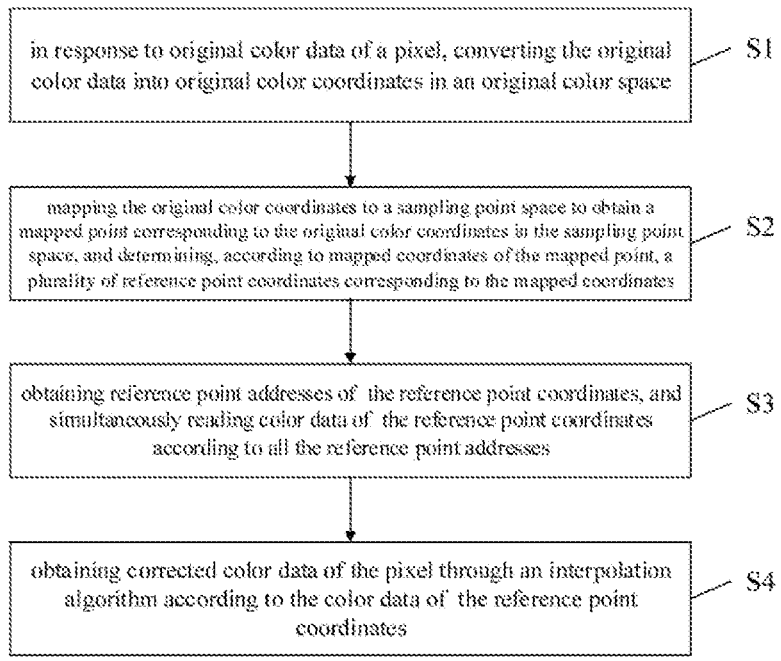
FIG. 1 is a flowchart illustrating a color correction method according to an embodiment of the present disclosure.

FIG. 1 is a flowchart illustrating a color correction method according to an embodiment of the present disclosure. As shown in FIG. 1, the method includes steps S1 to S4.

In the step S1, in response to original color data of a pixel, the original color data is converted into original color coordinates in an original color space.

In the step S1, the original color data of the pixel is converted into the original color coordinates in the original color space of an image to which the pixel belongs; and the pixel belongs to a specific target image, or belongs to a target frame of a specific target video. In some implementations, each pixel of the target image or the target frame is subjected to color correction.

In some implementations, the original color space may be any one of Lab (lightness, two color channels) color space, HSV (hue, saturation, value) color space, YUV (luminance, chrominance) color space, CMYK (cyan, magenta, yellow, key) color space, and RGB (red, green, blue) color space.

In the step S2, the original color coordinates are mapped to a sampling point space to obtain a mapped point corresponding to the original color coordinates in the sampling point space, and according to mapped coordinates of the mapped point, a plurality of reference point coordinates corresponding to the mapped coordinates are determined.

The original color coordinates are mapped to the sampling point space, that is, coordinate values of all dimensions of the original color coordinates are mapped respectively, and the original color coordinates of the pixel correspond to the unique mapped point; and the single mapped point corresponds to a plurality of reference points, the mapped coordinates correspond to the plurality of reference point coordinates accordingly, and thus correction is subsequently performed based on an interpolation algorithm.

In some implementations, a mapping relationship between original color coordinates and mapped coordinates corresponding thereto is set in advance, and the mapped coordinates and the reference point coordinates are determined by directly substituting to look up in the mapping relationship. In some implementations, the mapped coordinates are the same as the reference point coordinates corresponding thereto.

In the step S3, reference point addresses of all reference point coordinates are obtained, and color data of all the reference point coordinates are simultaneously read according to all the reference point addresses.

The reference point addresses corresponding to all the reference point coordinates are determined, and the color data of all the reference point coordinates stored in all the reference point addresses are simultaneously read.

In some implementations, the above step corresponds to a Look Up Table (LUT) color matching method, that is, a color matching method based on a display lookup table. Specifically, the LUT color matching method is 3DLUT color matching method, and when color correction is carried out with the 3DLUT color matching method, a corresponding address is determined according to color data every time a pixel signal arrives, and color calibration data stored in the corresponding address is found and output.

In the step S4, corrected color data of the pixel is obtained through an interpolation algorithm (Lerp) according to the color data of all the reference point coordinates.

Linear interpolation is performed based on the color data of all the reference point coordinates which are read simultaneously to obtain the corrected color data of the pixel.

The embodiment of the present disclosure provides a color correction method, which can be used to map original color coordinates corresponding to original color data of any one pixel to mapped coordinates in a sampling point space, determine a plurality of reference point coordinates corresponding to the mapped coordinates, obtain reference point addresses of all the reference point coordinates, simultaneously read color data of all the reference point coordinates accordingly, and obtain corrected color data of the pixel through an interpolation algorithm according to the color data of all the reference point coordinates. Thus, through quick coordinate mapping, parallel reading of the color data and the interpolation algorithm, the method can not only ensure accurate color correction but also meet a requirement of real-time processing of image/video streams and increase color correction efficiency.

Figure 2:
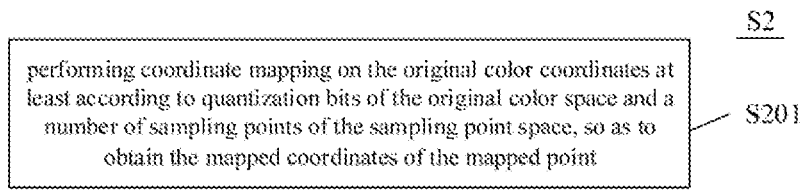
FIG. 2 is a flowchart illustrating a specific implementation method of step S2 according to the embodiment of the present disclosure.

FIG. 2 is a flowchart illustrating a specific implementation method of the step S2 according to the embodiment of the present disclosure. As shown in FIG. 2, specifically, mapping the original color coordinates to the sampling point space in the step S2 includes a step S201.

In the step S201, coordinate mapping is performed on the original color coordinates at least according to quantization bits of the original color space and the number of sampling points of the sampling point space, so as to obtain the mapped coordinates of the mapped point.

The quantization bits of the original color space correspond to a single dimension of the original color space, that is, a single color component, the quantization bits of all dimensions of the original color space are the same, and the quantization bits can be used to indicate the number of colors capable of being expressed by the color space. Taking the RGB color space as an example, if quantization bits of the RGB color space is 10 bits, a single color component corresponds to $2^{10}$ values, and the color space can express $2^{30}$ colors. The number of sampling points of the sampling point space also corresponds to a single dimension of the sampling point space, and is used to divide values of corresponding color components into intervals to determine the reference point coordinates. Taking a three-dimensional sampling point space including X-axis, Y-axis and Z-axis as an example, if the number of sampling points of the sampling point space is 17, 17 sampling points (including the zero point) and 16 intervals exist on each axis of the sampling point space, and the sampling point space has $17^3$ sampling points accordingly; in general, due to limits of capacity and processing speed of a processor, the number of sampling points may be 17 or 33 in order to ensure that the number of the intervals divided by the sampling points on each axis is a power of 2.

In some implementations, taking the RGB color space as an example of the original color space, the following formula is adopted in the step S201:

$$\begin{cases} R_s = \dfrac{R}{2^a - 1} \times b \\ G_s = \dfrac{G}{2^a - 1} \times b \\ B_s = \dfrac{B}{2^a - 1} \times b \end{cases}$$

The original color coordinates (R, G, B) are mapped to obtain a coordinate mapping result ($R_s$, $G_s$, $B_s$) which is taken as the mapped coordinates, where a is the quantization bits and b is the number of sampling points. Methods of coordinate mapping correspond to the other types of color spaces are similar to the method of coordinate mapping described above.

It should be noted that the above description of the method of coordinate mapping is only a specific implementation provided by the embodiments of the present disclosure, and does not limit the technical solutions of the present disclosure, and other methods of coordinate mapping are also applicable to the technical solutions of the present disclosure.

Figure 3:
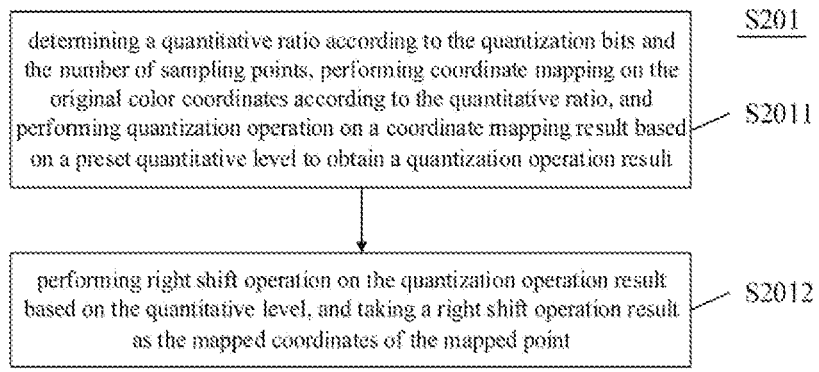
FIG. 3 is a flowchart illustrating a specific implementation method of step S201 according to the embodiment of the present disclosure.

FIG. 3 is a flowchart illustrating a specific implementation method of the step S201 according to the embodiment of the present disclosure. As shown in FIG. 3, performing coordinate mapping on the original color coordinates at least according to the quantization bits of the original color space and the number of sampling points of the sampling point space so as to obtain the mapped coordinates of the mapped point in the step S201 includes steps S2011 and S2012.

In the step S2011, a quantitative ratio is determined according to the quantization bits and the number of sampling points, coordinate mapping is performed on the original color coordinates according to the quantitative ratio, and quantization operation is performed on a coordinate mapping result based on a preset quantitative level to obtain a quantization operation result.

A quantitative difference between the two coordinate spaces is determined according to the quantization bits of the original color space and the number of sampling points of the sampling point space, and is expressed in the form of the quantitative ratio; and enough decimal point data is maintained during the process of quantization operation to ensure calculation accuracy.

In some implementations, a value of the quantitative level may be 24 bits. In some implementations, taking the RGB color space as an example of the original color space, the following formula is adopted in the step S2011 based on the implementation described in the above illustration of the step S201:

$$\begin{cases} R_{s2} = INT\left(\dfrac{R}{2^a - 1} \times b + 0.5\right) \times 2^c \\ G_{s2} = INT\left(\dfrac{G}{2^a - 1} \times b + 0.5\right) \times 2^c \\ B_{s2} = INT\left(\dfrac{B}{2^a - 1} \times b + 0.5\right) \times 2^c \end{cases}$$

The quantization operation result ($R_{s2}$, $G_{s2}$, $B_{s2}$) is obtained according to the original color coordinates (R, G, B), where a is the quantization bits, b is the number of sampling points, INT( ) represents rounding operation, the 0.5 added is used to adjust a carry during the rounding operation, and c is the quantitative level; the quantitative ratio is expressed as $b/2^a - 1$; and right shift operation may be performed later based on the quantitative level and the quantization operation result obtained by the formula.

It should be noted that the above description of the method of quantization operation is only a specific implementation provided by the embodiment of the present disclosure, and does not limit the technical solutions of the present disclosure, and other methods of quantization operation are also applicable to the technical solutions of the present disclosure.

In the step S2012, the right shift operation is performed on the quantization operation result based on the quantitative level, and a right shift operation result is taken as the mapped coordinates of the mapped point.

After the quantization operation is completed, with enough decimal point data maintained, the right shift operation (logical right shift operation) needs to be performed based on the quantitative level to restore a processing result of coordinate mapping.

Figure 4:
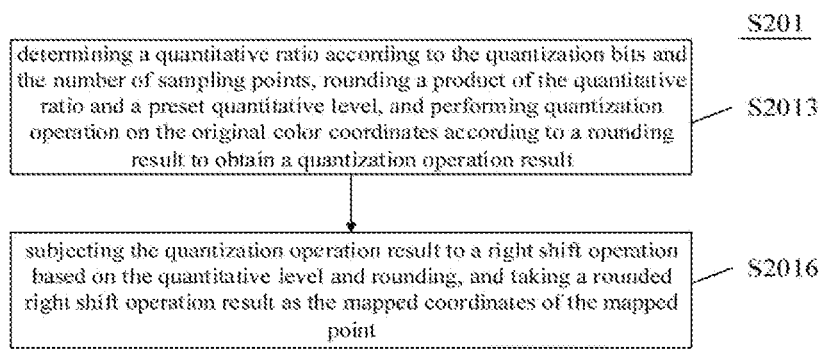
FIG. 4 is a flowchart illustrating another specific implementation method of the step S201 according to the embodiment of the present disclosure.

FIG. 4 is a flowchart illustrating another specific implementation method of the step S201 according to the embodiment of the present disclosure. As shown in FIG. 4, performing coordinate mapping on the original color coordinates at least according to the quantization bits of the original color space and the number of sampling points of the sampling point space so as to obtain the mapped coordinates of the mapped point in the step S201 includes steps S2013 and S2016.

In the step S2013, the quantitative ratio is determined according to the quantization bits and the number of sampling points, a product of the quantitative ratio and a preset quantitative level is rounded, and the quantization operation is performed on the original color coordinates according to a rounding result to obtain the quantization operation result.

The implementation method can be applied to a Field Programmable Gate Array (FPGA for short). Since the Field Programmable Gate Array can only perform fixed-point calculation, floating point numbers appearing in operation processes need to be processed and results of part of the operation processes need to be rounded. In some implementations, a value of the quantitative level may be 24 bits.

In the step S2016, the quantization operation result is subjected to the right shift operation based on the quantitative level and is rounded, and a rounded right shift operation result is taken as the mapped coordinates of the mapped point.

In some implementations, taking the RGB color space as an example of the original color space, the following formulae are adopted in the steps S2013 and S2016:

$$R_{s3} = INT\left[\frac{R \times INT\left(\frac{b}{2^a-1} \times 2^c\right)}{2^c}\right],$$

$$G_{s3} = INT\left[\frac{G \times INT\left(\frac{b}{2^a-1} \times 2^c\right)}{2^c}\right], B_{s3} = INT\left[\frac{B \times INT\left(\frac{b}{2^a-1} \times 2^c\right)}{2^c}\right]$$

The original color coordinates (R, G, B) are subjected to coordinate mapping, quantization operation and right shift operation to finally obtain the right shift operation result $(R_{s3}, G_{s3}, B_{s3})$, where a is the quantization bits, b is the number of sampling points, INT( ) represents rounding operation, and c is the quantitative level; and the quantitative ratio is expressed as $b/2^a-1$.

It should be noted that the above description of the method of determining the mapped coordinates is only a specific implementation provided by the embodiment of the present disclosure, and does not limit the technical solutions of the present disclosure, and other methods of determining the mapped coordinates are also applicable to the technical solutions of the present disclosure.

Figure 5:
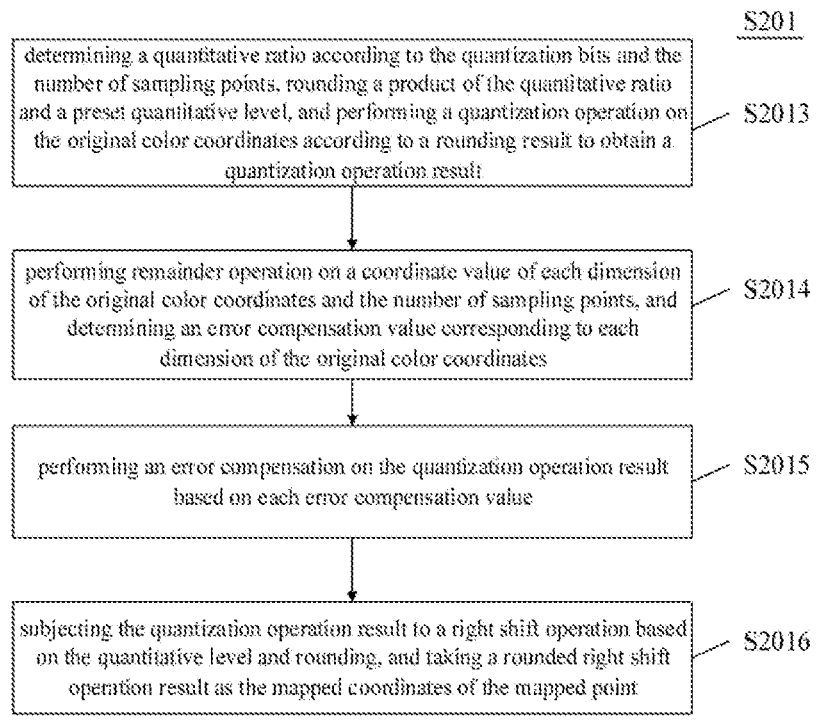
FIG. 5 is a flowchart illustrating still another specific implementation method of the step S201 according to the embodiment of the present disclosure.

FIG. 5 is a flowchart illustrating still another specific implementation method of the step S201 according to the embodiment of the present disclosure. Specifically, based on the specific implementation method illustrated by FIG. 4, as shown in FIG. 5, after the step S2013 and before the step S2016, the step S201 further includes steps S2014 and S2015.

In the step S2014, a remainder operation is performed on a coordinate value of each dimension of the original color coordinates and the number of sampling points, and an error compensation value corresponding to each dimension of the original color coordinates is determined.

In a processing flow of each pixel, since the quantization operation is performed according to the rounding result obtained by rounding the product of the quantitative ratio and the preset quantitative level in the step S2013, a discarded decimal part in the rounding causes an error, which may increase continuously with calculation when the quantization operation is performed on the original color coordinates according to the rounding result, so that such error cannot be compensated by adopting a static fixed correction value; moreover, since the quantitative level is involved in the operation in the form of the power of 2, a certain accumulative error may be generated when addition operation or multiplication operation is performed periodically, and produces a result that mapping cannot be carried out at a peripheral boundary of the sampling point space, so that periodic error compensation needs to be performed to offset the error.

In some implementations, a target interval corresponding to each dimension of the original color coordinates is determined through remainder operation, and the error compensation value is determined according to a maximum coordinate value corresponding to the interval.

In the step S2015, error compensation is performed on the quantization operation result based on each error compensation value.

In some implementations, the error compensation is implemented by adding the error compensation value corresponding to each dimension and the coordinate value of the dimension corresponding to the quantization operation result.

Illustratively, in a case where the number of sampling points is 17, the original color space is the RGB color space, and values corresponding to three dimensions R, G and B of the original color coordinates are 62, 93 and 124 respectively, 62, 93 and 124 are respectively subjected to remainder operation with 17, and remainder operation results are taken as error compensation values, thus obtaining the error compensation values corresponding to the three dimensions R, G and B which are 11, 8 and 5 respectively; 62, 93 and 124 are subjected to quantization operation based on the preset quantitative level to obtain the quantization operation result, and the error compensation is performed by adding a value corresponding to each dimension of the quantization operation result and the error compensation value of 11, 8 or 5 corresponding to each dimension; the right shift operation is performed based on the quantitative level on the quantization operation result obtained after the error compensation, and the right shift operation result is taken as the mapped coordinates; thus, one coordinate mapping is completed.

The embodiment of the present disclosure provide a color correction method which can be used to avoid the mapping error through periodic error compensation, and increase accuracy of coordinate mapping and accuracy of subsequent color correction.

Figure 6:
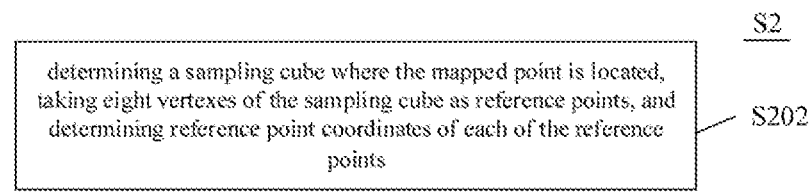
FIG. 6 is a flowchart illustrating another specific implementation method of the step S2 according to the embodiment of the present disclosure.

FIG. 6 is a flowchart illustrating another specific implementation method of the step S2 according to the embodiment of the present disclosure. Specifically, the sampling point space is a three-dimensional Cartesian coordinate system including a first direction, a second direction and a third direction corresponding to axes thereof; according to the preset number of sampling points, a plurality of sampling points are respectively arranged along the first direction, the second direction and the third direction in the sampling point space and are arranged at equal intervals, and every eight adjacent sampling points are taken as vertexes to form a sampling cube and may be divided into four groups in any one of the first direction, the second direction and the third direction, a line segment formed by the two sampling points of each group is parallel to the direction in which the eight sampling points are divided into the four groups, a line segment composed of two sampling points of each group is parallel to this direction and the two sampling points of each group are separated by one unit length; spaces occupied by the sampling cubes are the same in volume, and all the sampling cubes form the sampling point space; taking the three-dimensional sampling point space whose first direction, second direction and third direction correspond to X-axis, Y-axis and Z-axis as an example, if the number of sampling points of the sampling point space is 17, 17 sampling points (including the zero point) and 16 intervals exist on each axis of the sampling point space, and accordingly, $17^3$ sampling points in total and $(17-1)^3$, i.e., $16^3$ sampling cubes exist in the sampling point space.

As shown in FIG. 6, determining the plurality of reference point coordinates corresponding to the mapped coordinates according to the mapped coordinates of the mapped point in the step S2 includes a step S202.

In the step S202, a sampling cube where the mapped point is located is determined, eight vertexes of the sampling cube are taken as reference points, and reference point coordinates of each of the reference points are determined.

The number of sampling points of the sampling point space corresponds to a single dimension of the sampling point space, the numbers of the sampling points on the axes of the sampling point space are the same, each sampling cube is a cube, and a length of sides of the cube is one unit length.

In some implementations, when the mapped point is located at a vertex on one side of any one of the sampling cubes, one sampling cube is selected according to a preset selection strategy from one or more sampling cubes including such vertex so as to determine the reference points, and the selection strategy includes selecting according to spatial positions of sampling cubes, selecting according to a preset priority of sampling cubes, etc.

FIG. 7 is a flowchart illustrating a specific implementation method of the step S4 according to the embodiment of the present disclosure. Specifically, based on the step S202 illustrated by FIG. 6, as shown in FIG. 7, obtaining the corrected color data through the interpolation algorithm according to the color data of all the reference point coordinates in the step S4 includes a step S401.

In the step S401, all color components corresponding to the color data of all the reference point coordinates are corrected through the interpolation algorithm; and when any one of the color components is corrected, trilinear interpolation operation is performed based on the first direction, the second direction and the third direction according to corresponding color component data in the color data of all the reference point coordinates.

Each of the color components is corrected through the interpolation algorithm based on color component data corresponding to the plurality of reference points, and the corrected color data is obtained according to the corrected color component data.

FIG. 8 is a flowchart illustrating a specific implementation method of the step S401 according to the embodiment of the present disclosure. As shown in FIG. 8, performing the trilinear interpolation operation based on the first direction, the second direction and the third direction according to the corresponding color component data in the color data of all the reference point coordinates when any one of the color components is corrected in the step S401 includes:

step S4011, according to color component data corresponding to four adjacent groups of reference points in the first direction, simultaneously performing four interpolation operations in the first direction, and storing results of the four interpolation operations in corresponding first registers respectively;

step S4012, reading data from each of the first registers, simultaneously performing two interpolation operations in the second direction, and storing results of the two interpolation operations in corresponding second registers respectively; and step S4013, reading data from each of the second registers, and performing an interpolation operation in the third direction to obtain the corrected color component data.

The trilinear interpolation operation is split in a multistage pipeline manner, the registers are added between stages of operation to construct cache regions, and a component corresponding to each stage of operation completes one single-step operation in each clock cycle, and outputs a result to the next stage of operation. Thus, when the pipeline is fully loaded, that is, when the multistage pipeline operates with a full load, a correction result may be output in each clock cycle. According to practical experiments, taking a video stream of 4K and 60 fps as an example, it takes 16.67 ms to complete operation of one frame of the video stream based on the above design.

Figure 9:
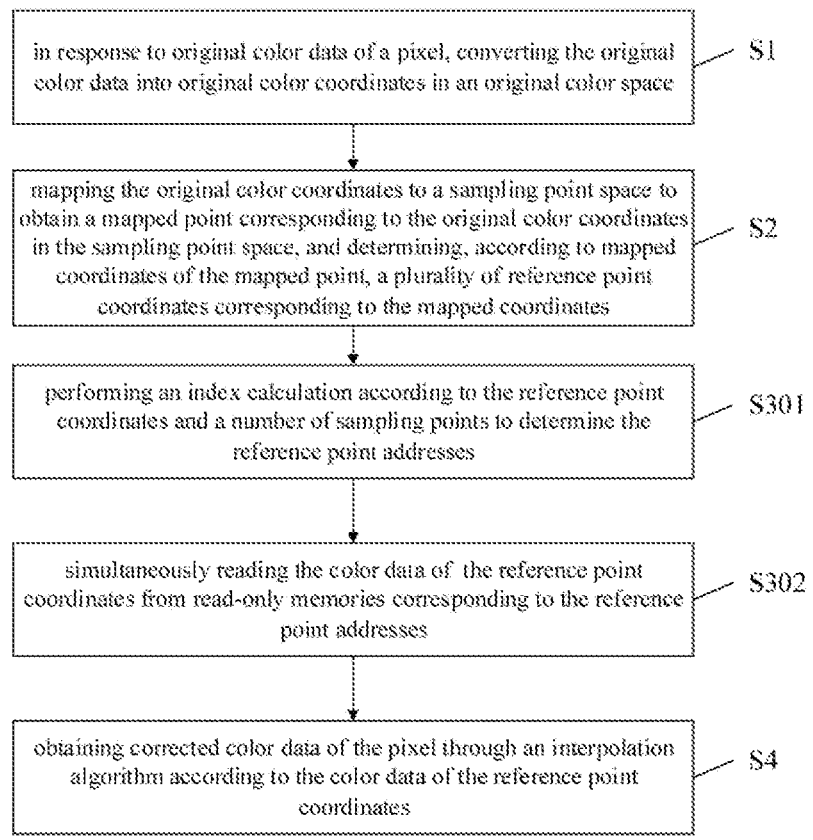
FIG. 9 is a flowchart illustrating another color correction method according to an embodiment of the present disclosure.

FIG. 9 is a flowchart illustrating another color correction method according to the embodiment of the present disclosure. Specifically, the method is a specific alternative implementation based on the method illustrated by FIG. 1. As shown in FIG. 9, the method not only includes the steps S1, S2 and S4, but also includes steps S301 and S302, and the steps S301 and S302 are a specific alternative implementation of the step S3. Only the steps S301 and S302 are described in detail below.

Obtaining the reference point addresses of all the reference point coordinates, and simultaneously reading the color data of all the reference point coordinates according to all the reference point addresses in the step S3 includes steps S301 and S302.

In the step S301, an index calculation is performed according to all the reference point coordinates and the number of sampling points to determine all the reference point addresses.

The reference point addresses of all the reference point coordinates are calculated in parallel so as to provide addresses where color data used for correction are located.

In some implementations, taking the RGB color space as an example of the original color space, the following formula is adopted:

$$\text{Address}=b^2\times R_d+b\times G_d+B_d$$

An index Address of the reference point addresses is obtained based on the reference point coordinates ($R_d$, $G_d$, $B_d$), where b is the number of sampling points. Other methods of index calculation corresponding to the other types of color spaces are similar to the method of index calculation described above.

It should be noted that the above description of the method of index calculation is only a specific implementation provided by the embodiment of the present disclosure, and does not limit the technical solutions of the present disclosure, and other methods of index calculation are also applicable to the technical solutions of the present disclosure.

In the step S302, the color data of all the reference point coordinates are simultaneously read from read-only memories corresponding to all the reference point addresses.

By simultaneously reading the color data of all the reference point coordinates from all the read-only memories, processing efficiency and operation efficiency are increased through the parallel operation.

Figure 10:
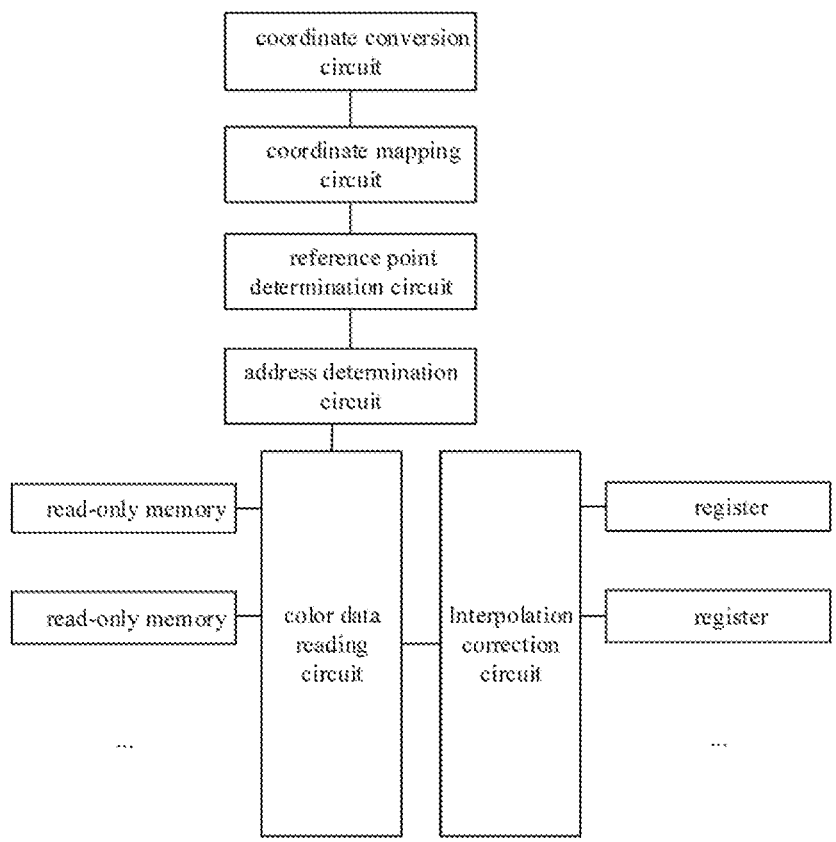
FIG. 10 is a schematic structural diagram of a Field Programmable Gate Array according to an embodiment of the present disclosure.

FIG. 10 is a schematic structural diagram of a Field Programmable Gate Array according to an embodiment of the present disclosure. As shown in FIG. 10, the Field Programmable Gate Array includes: a plurality of read-only memories, a plurality of registers, a coordinate conversion circuit, a coordinate mapping circuit, an address determination circuit, a color data reading circuit, an interpolation correction circuit, and a reference point determination circuit.

Specifically, the plurality of read-only memories are configured to store color data of all corresponding reference point coordinates.

The coordinate conversion circuit is configured to convert original color data into original color coordinates in an original color space.

The coordinate mapping circuit is configured to map the original color coordinates to a sampling point space; a quantitative ratio is determined according to quantization bits of the original color space and the number of sampling points of the sampling point space, coordinate mapping is performed on the original color coordinates according to the quantitative ratio, and quantization operation is performed on a coordinate mapping result based on a preset quantitative level to obtain a quantization operation result; and a right shift operation is performed on the quantization operation result based on the quantitative level, and a right shift operation result is taken as mapped coordinates of a mapped point.

The reference point determination circuit is configured to determine a sampling cube where the mapped point is located, take eight vertexes of the sampling cube as reference points, and determine reference point coordinates of all the reference points. The sampling point space is a three-dimensional Cartesian coordinate system including a first direction, a second direction and a third direction corresponding to axes thereof; according to the number of sampling points, a plurality of sampling points are respectively arranged along the first direction, the second direction and the third direction in the sampling point space and are arranged at equal intervals, every eight adjacent sampling points are taken as the vertexes to form one sampling cube, and all the sampling cubes form the sampling point space.

The address determination circuit is configured to perform index calculation according to all the reference point coordinates and the number of sampling points to determine all reference point addresses.

The color data reading circuit is configured to simultaneously read the color data of all the reference point coordinates from the read-only memories corresponding to all the reference point addresses.

The interpolation correction circuit is configured to correct all color components corresponding to the color data of all the reference point coordinates through an interpolation algorithm. When any one of the color components is corrected, a trilinear interpolation operation is performed according to corresponding color component data in the color data of all the reference point coordinates and based on the first direction, the second direction and the third direction, which correspond to the axes of the sampling point space; and results of interpolation operations performed along the first direction, the second direction and the third direction are respectively stored in the respective registers.

In some implementations, the interpolation correction circuit is specifically configured to simultaneously perform, according to color component data corresponding to four adjacent groups of reference points in the first direction, four interpolation operations in the first direction, and store results of the four interpolation operations in the first registers respectively; read data from each of the first registers, simultaneously perform two interpolation operations in the second direction, and store results of the two interpolation operations in the second registers respectively; and read data from each of the second registers, and perform an interpolation operation in the third direction to obtain corrected color component data.

The embodiment of the present disclosure provides the Field Programmable Gate Array, which can optimize reading of the color data and interpolation operation processes through a multi-stage pipeline design while meeting a requirement of calibration accuracy, and each stage of computing components in a circuit completes one single-step operation in each clock cycle, and outputs a result to the next stage of computing component. Thus, when the pipeline is fully loaded, that is, a correction result can be output in each clock cycle. With the multi-stage pipeline design, frame processing time is shortened, and a low-latency chip-level color correction device is constructed.

Figure 11:
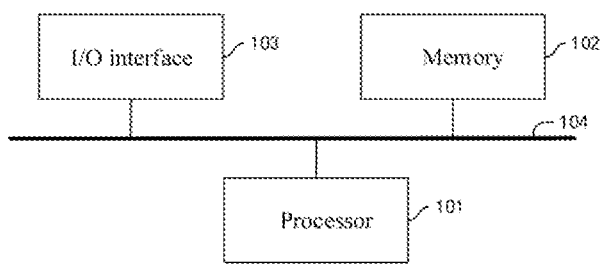
FIG. 11 is a schematic structural diagram of a chip according to an embodiment of the present disclosure.

FIG. 11 is a schematic structural diagram of a chip according to an embodiment of the present disclosure. As shown in FIG. 11, the chip includes:
one or more processors 101;
a memory 102 having one or more programs stored thereon, when the one or more programs are executed by the one or more processors, the one or more processors perform any one of the color correction methods described in the above embodiment; and
one or more Input/Output (I/O) interfaces 103 connected between the processor(s) and the memory and configured to enable information interaction between the processor(s) and the memory.

The processor 101 is a device having data processing capability, and includes, but is not limited to, a Central Processing Unit (CPU); the memory 102 is a device having data storage capability, and includes, but is not limited to, a Random Access Memory (RAM, more specifically, a Synchronous Dynamic Random Access Memory (SDRAM) or a Dynamic Random Access Memory (DRAM)), a Read-only Memory (ROM), an Electrically Erasable Programmable Read-only Memory (EEPROM), and a flash memory; and the I/O interface (read/write interface) 103 is connected between the processor 101 and the memory 102, is capable of enabling information interaction between the processor 101 and the memory 102, and includes, but is not limited to, a data bus.

In some implementations, the processor 101, the memory 102, and the I/O interface 103 are connected to each other through a bus 104, and are then connected to other components of a computing device.

Figure 12:
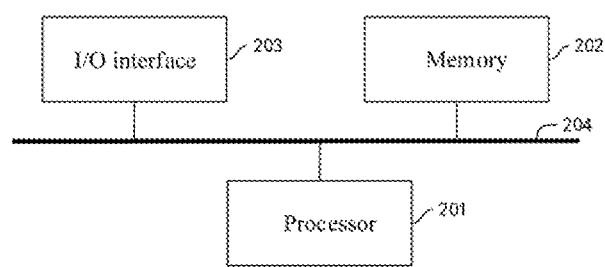
FIG. 12 is a schematic structural diagram of a display device according to an embodiment of the present disclosure.

FIG. 12 is a schematic structural diagram of a display device according to an embodiment of the present disclosure. As shown in FIG. 12, the display device includes:

one or more processors 201;

a memory 202 having one or more programs stored thereon, when the one or more programs are executed by the one or more processors, the one or more processors perform any one of the color correction methods described in the above embodiment; and one or more Input/Output (I/O) interfaces 203 connected between the processor(s) and the memory and configured to enable information interaction between the processor(s) and the memory.

The processor 201 is a device having data processing capability, and includes, but is not limited to, a CPU; the memory 202 is a device having data storage capability, and includes, but is not limited to, an RAM (more specifically, an SDRAM or a DDR), an ROM, an EEPROM, and a flash memory; and the I/O interface (read/write interface) 203 is connected between the processor 201 and the memory 202, is capable of enabling information interaction between the processor 201 and the memory 202, and includes, but is not limited to, a data bus.

In some implementations, the processor 201, the memory 202, and the I/O interface 203 are connected to each other through a bus 204, and are then connected to other components of a computing device.

In some implementations, the display device further includes a display panel, and original color data corresponding to an image or a video is corrected and then is transmitted to the display panel; and the display device may be a monitor, which can convert an input native screen gamut to a target gamut through color correction.

It should be understood by those of ordinary skill in the art that the functional circuits/units in all or some of the steps and the devices in the method disclosed above may be implemented as software, firmware, hardware, or suitable combinations thereof. If implemented as hardware, the division between the functional circuits/units stated above is not necessarily corresponding to the division of physical components; for example, one physical component may have a plurality of functions, or one function or step may be performed through cooperation of several physical components. Some or all of the physical components may be implemented as software executable by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program circuits and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program circuits, or other data in modulated data signals such as carrier wave or other transmission mechanism, and may include any information delivery medium.

The present disclosure discloses the exemplary embodiments and adopts specific terms, but the terms are merely used and should be merely interpreted as having general illustrative meanings, rather than for the purpose of limitation. In some implementations, unless expressly stated otherwise, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure stated by the appended claims.

What is claimed is:

1. A color correction method, comprising:

in response to original color data of a pixel, converting the original color data into original color coordinates in an original color space;

mapping the original color coordinates to a sampling point space to obtain a mapped point corresponding to the original color coordinates in the sampling point space, and determining, according to mapped coordinates of the mapped point, a plurality of reference point coordinates corresponding to the mapped coordinates;

obtaining reference point addresses of the plurality of reference point coordinates, and simultaneously reading color data of the plurality of reference point coordinates according to the reference point addresses; and obtaining corrected color data of the pixel through an interpolation algorithm according to the color data of the plurality of reference point coordinates, wherein the mapping the original color coordinates to the sampling point space comprises: performing coordinate mapping on the original color coordinates at least according to quantization bits of the original color space and a number of sampling points of the sampling point space, so as to obtain the mapped coordinates of the mapped point, which further comprises:

determining a quantitative ratio according to the quantization bits and the number of sampling points, performing the coordinate mapping on the original color coordinates according to the quantitative ratio, and performing quantization operation on a coordinate mapping result based on a preset quantitative level to obtain a quantization operation result; and performing a right shift operation on the quantization operation result based on the quantitative level, and taking a right shift operation result as the mapped coordinates of the mapped point.

2. The color correction method of claim 1, wherein the performing coordinate mapping on the original color coordinates at least according to the quantization bits of the original color space and the number of sampling points of the sampling point space so as to obtain the mapped coordinates of the mapped point comprises:

determining a quantitative ratio according to the quantization bits and the number of sampling points, rounding a product of the quantitative ratio and a preset quantitative level, and performing a quantization operation on the original color coordinates according to a rounding result to obtain a quantization operation result; and subjecting the quantization operation result to a right shift operation based on the quantitative level and rounding, and taking a rounded right shift operation result as the mapped coordinates of the mapped point.

3. The color correction method of claim 2, wherein after the quantization operation is performed on the original color coordinates according to the rounding result to obtain the quantization operation result and before the quantization operation result is subjected to the right shift operation based on the quantitative level and rounding, the method further comprises:

performing a remainder operation on a coordinate value of each dimension of the original color coordinates and the number of sampling points, and determining an error compensation value corresponding to each dimension of the original color coordinates; and performing an error compensation on the quantization operation result based on each error compensation value.

4. A chip, comprising:
one or more processors; and
a memory configured to store one or more programs;
when the one or more programs are executed by the one or more processors, the one or more processors perform the color correction method of claim 3.

5. A display device, comprising:
one or more processors; and
a memory configured to store one or more programs;
when the one or more programs are executed by the one or more processors, the one or more processors perform the color correction method of claim 3.

6. A chip, comprising:
one or more processors; and
a memory configured to store one or more programs;
when the one or more programs are executed by the one or more processors, the one or more processors perform the color correction method of claim 2.

7. A display device, comprising:
one or more processors; and
a memory configured to store one or more programs;
when the one or more programs are executed by the one or more processors, the one or more processors perform the color correction method of claim 2.

8. The color correction method of claim 1, wherein the sampling point space is a three-dimensional Cartesian coordinate system comprising a first direction, a second direction and a third direction corresponding to axes thereof; according to a preset number of sampling points, a plurality of sampling points are respectively arranged along the first direction, the second direction and the third direction in the sampling point space and are arranged at equal intervals, every eight adjacent sampling points are taken as vertexes to form a sampling cube, and all sampling cubes form the sampling point space, and the determining, according to the mapped coordinates of the mapped point, the plurality of reference point coordinates corresponding to the mapped coordinates comprises:

determining a sampling cube where the mapped point is located, taking eight vertexes of the sampling cube as reference points, and determining reference point coordinates of each of the reference points.

9. The color correction method of claim 8, wherein the obtaining the corrected color data through the interpolation algorithm according to the color data of the plurality of reference point coordinates comprises:

correcting all color components corresponding to the color data of the plurality of reference point coordinates through the interpolation algorithm; wherein, when any one of the color components is corrected, a trilinear interpolation operation is performed based on the first direction, the second direction and the third direction according to corresponding color component data in the color data of the plurality of reference point coordinates.

10. The color correction method of claim 9, wherein the performing the trilinear interpolation operation based on the first direction, the second direction and the third direction according to the corresponding color component data in the color data of the plurality of the reference point coordinates comprises:

according to color component data corresponding to four adjacent groups of reference points in the first direction, simultaneously performing four interpolation operations in the first direction, and storing results of the four interpolation operations in corresponding first registers respectively;

reading data from each of the first registers, simultaneously performing two interpolation operations in the second direction, and storing results of the two interpolation operations in corresponding second registers respectively; and reading data from each of the second registers, and performing an interpolation operation in the third direction to obtain corrected color component data.

11. A chip, comprising:
one or more processors; and
a memory configured to store one or more programs;
when the one or more programs are executed by the one or more processors, the one or more processors perform the color correction method of claim 10.

12. A display device, comprising:
one or more processors; and
a memory configured to store one or more programs;
when the one or more programs are executed by the one or more processors, the one or more processors perform the color correction method of claim 8.

13. A chip, comprising:
one or more processors; and
a memory configured to store one or more programs;
when the one or more programs are executed by the one or more processors, the one or more processors perform the color correction method of claim 9.

14. A display device, comprising:
one or more processors; and
a memory configured to store one or more programs;
when the one or more programs are executed by the one or more processors, the one or more processors perform the color correction method of claim 9.

15. A chip, comprising:
one or more processors; and
a memory configured to store one or more programs;
when the one or more programs are executed by the one or more processors, the one or more processors perform the color correction method of claim 8.

16. The color correction method of claim 1, wherein the obtaining the reference point addresses of the plurality of reference point coordinates, and simultaneously reading the color data of the plurality of reference point coordinates according to the reference point addresses comprises:

performing an index calculation according to the plurality of reference point coordinates and a number of sampling points to determine the reference point addresses; and simultaneously reading the color data of the plurality of reference point coordinates from read-only memories corresponding to the reference point addresses.

17. A chip, comprising:
one or more processors; and
a memory configured to store one or more programs;
when the one or more programs are executed by the one or more processors, the one or more processors perform the color correction method of claim 1.

18. A display device, comprising:
one or more processors; and
a memory configured to store one or more programs;
when the one or more programs are executed by the one or more processors, the one or more processors perform the color correction method of claim 1.

19. A Field Programmable Gate Array, comprising:
a plurality of read-only memories configured to store color data of respective reference point coordinates;
a plurality of registers;
a coordinate conversion circuit configured to convert original color data into original color coordinates in an original color space;
a coordinate mapping circuit configured to map the original color coordinates to a sampling point space; wherein, a quantitative ratio is determined according to quantization bits of the original color space and a number of sampling points of the sampling point space, coordinate mapping is performed on the original color coordinates according to the quantitative ratio, and a quantization operation is performed on a coordinate mapping result based on a preset quantitative level to obtain a quantization operation result; and a right shift operation is performed on the quantization operation result based on the quantitative level, and a right shift operation result is taken as mapped coordinates of a mapped point;
a reference point determination circuit configured to determine a sampling cube where the mapped point is located, take eight vertexes of the sampling cube as reference points, and determine reference point coordinates of the reference points; wherein, the sampling point space is a three-dimensional Cartesian coordinate system comprising a first direction, a second direction and a third direction corresponding to axes thereof; according to the number of sampling points, a plurality of sampling points are respectively arranged along the first direction, the second direction and the third direction in the sampling point space and are arranged at equal intervals, every eight adjacent sampling points are taken as vertexes to form a sampling cube, and all the sampling cubes form the sampling point space;
an address determination circuit configured to perform an index calculation according to the reference point coordinates and the number of sampling points to determine reference point addresses;
a color data reading circuit configured to simultaneously read the color data of the reference point coordinates from the read-only memories corresponding to the reference point addresses; and
an interpolation correction circuit configured to correct all color components corresponding to the color data of the reference point coordinates through an interpolation algorithm; wherein, when any one of the color components is corrected, a trilinear interpolation operation is performed based on the first direction, the second direction and the third direction according to corresponding color component data in the color data of the reference point coordinates; and results of interpolation operations performed along the first direction, the second direction and the third direction are respectively stored in the respective registers.

20. The Field Programmable Gate Array of claim 19, wherein
the interpolation correction circuit is configured to simultaneously perform, according to color component data corresponding to four adjacent groups of reference points in the first direction, four interpolation operations in the first direction, and store results of the four interpolation operations in corresponding first registers respectively; read data from each of the first registers, simultaneously perform two interpolation operations in the second direction, and store results of the two interpolation operations in corresponding second registers respectively; and read data from each of the second registers, and perform an interpolation operation in the third direction to obtain corrected color component data.

* * * * *